Patented Dec. 6, 1932

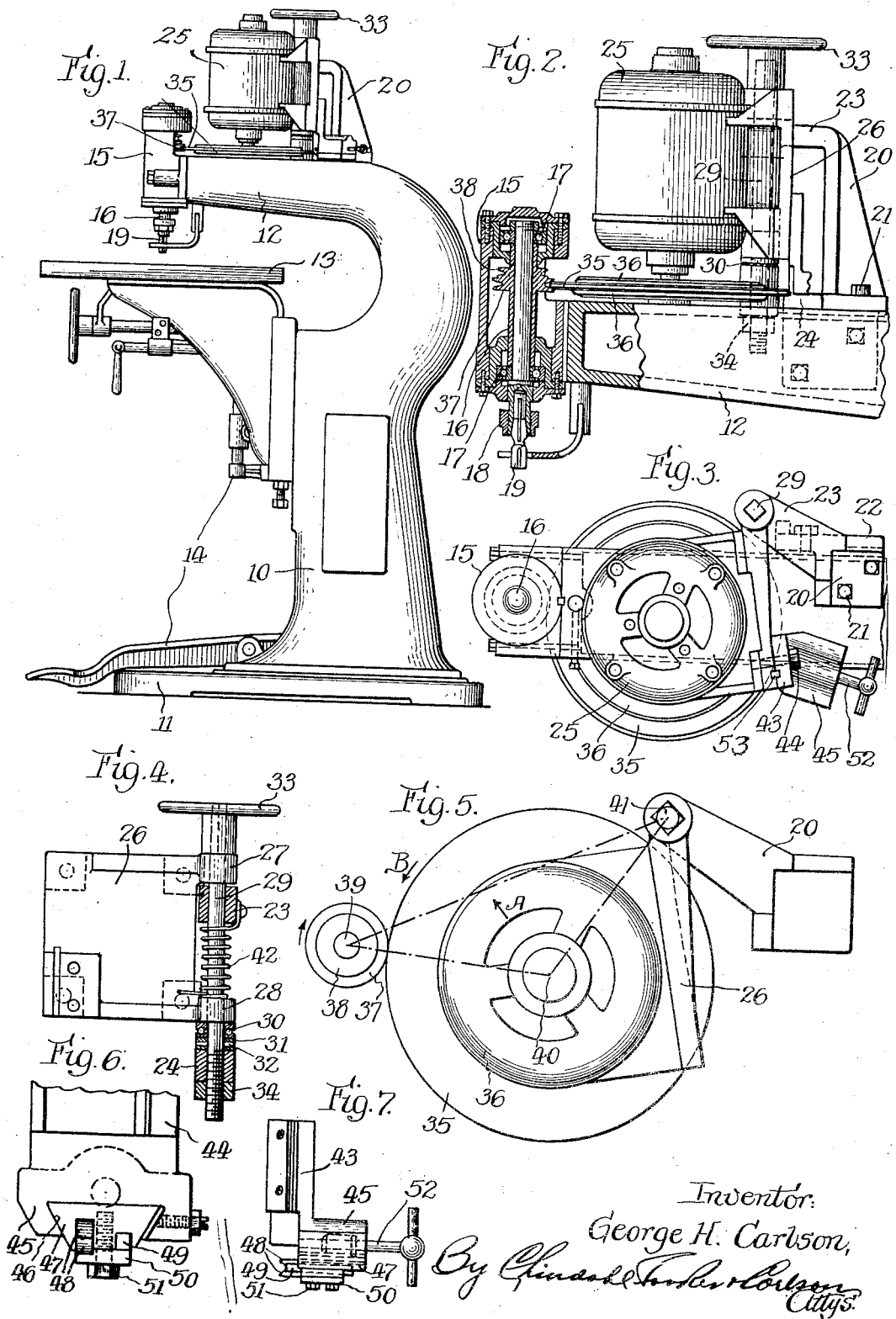

1,889,947

UNITED STATES PATENT OFFICE

GEORGE H. CARLSON, OF ROCKFORD, ILLINOIS, ASSIGNOR TO EKSTROM, CARLSON & CO., OF ROCKFORD, ILLINOIS, A CORPORATION OF ILLINOIS

FRICTIONAL DRIVE FOR A ROUTER OR THE LIKE

Application filed October 10, 1928. Serial No. 311,502.

The invention relates to a router or like machine tool and refers more particularly to the spindle-driving mechanism thereof.

The general object of the invention is to provide a novel and improved friction driving means which is especially suited for driving the spindle at exceptionally high speeds without vibration or chatter.

In machines of this type it is frequently desirable to effect a variation of the driven speed of the tool spindle and it is also an object of the invention to provide a new and improved driving mechanism which may be readily changed to vary the speed of the driven element.

Another object of the invention resides in the provision of a novel arrangement of the driving and driven elements in which the driving connection therebetween becomes more positive as the driven element is placed under an increased load or as the speed of the driving element is increased. By such an arrangement it becomes possible to drive a machine of this character by a friction type drive since the usual difficulties of slipping, chattering and unusual vibration, and similar objectionable features caused when high speeds are attempted, are overcome thereby.

A further object of the invention is to provide a simple mounting for the driving element.

Still another object of the invention is to provide a novel means for dressing or "truing up" the engaging surface of the driving wheel.

Other objects and advantages will become apparent in the following description and from the accompanying drawing in which:

Figure 1 is a side elevational view of a machine embodying the features of the invention.

Fig. 2 is a side elevation partially in section and on an enlarged scale of the driving mechanism.

Fig. 3 is a plan view of the mechanism shown in Fig. 2.

Fig. 4 is a rear elevation partially in section of the mounting for the motor.

Fig. 5 is a diagrammatic plan showing the arrangement and disposition of the parts of the driving and driven elements.

Figs. 6 and 7 are detail views of the dressing device showing front and side elevations respectively.

Although the invention is susceptible of various modifications and alternative constructions, I have shown and will herein describe in detail the preferred embodiment but it is to be understood that I do not thereby intend to limit the invention to the specific form disclosed but intend to cover all modifications and alternative constructions falling within the spirit and scope of the invention as expressed in the appended claim.

In presenting a more detailed description of the invention, the router illustrated herein is, in general, of a conventional type which embodies an improved form of frictional driving mechanism constituting an important part of the invention. This driving mechanism consists of a novel arrangement of the driving and driven elements in which the axis of one of the elements is capable of a relatively free movement toward or from the axis of the other element. In conjunction with this relative movement, the direction of rotation of the driving and driven elements at the point of contact is in the opposite direction from the approaching movement of the two axes, with the result that the driving engagement induces a force tending to maintain the engagement. The relative movement of the driving and driven elements is also utilized in effecting the adjustment to vary the speed of the router spindle.

More particularly describing the illustrated embodiment, the machine comprises an upright pedestal 10 supported upon a base 11, and having at its upper end a horizontally extending overarm 12. The side of the pedestal underlying the overarm is provided with suitable vertical ways for supporting and guiding a work table 13, which, through suitable actuating connections, generally indicated at 14, is capable of being moved vertically toward and from the overarm. The free end of the overarm carries a spindle housing 15 rigidly fixed thereon, within which a tool spindle 16 is mounted in suitable ball bearings 17 for rotation on a vertical axis. The lower end of the spindle may be provided with a well known type of chuck 18 to receive a working tool 19.

The preferred embodiment of the driving mechanism comprises a frictional engagement between the driving element and the spindle which is adjustable by a swinging, shifting movement of the driving element bodily into any one of several engaging positions. To this end a bracket 20 is securely mounted on the upper side of the overarm as by means of the bolts 21 and extends upwardly and outwardly therefrom. For added rigidity the bracket may be provided with a depending side portion 22 which abuts and is secured to the side of the overarm. The bracket, near the top and bottom thereof, has a pair of forwardly extending vertically spaced arms 23, 24 which are bored to form vertically alined bearings therein.

While the driving means may be of any suitable type capable of driving the spindle at the desired high speed, in the present instance an electric motor 25 is employed. The motor is mounted with the axis thereof in a vertical position substantially parallel with the axis of the spindle 16, and is rigidly secured to a vertically disposed supporting plate 26 in any suitable manner. One side of the supporting plate is provided with a pair of spaced lugs 27, 28 which are bored, in a manner similar to the bracket arms 23, 24 to provide alined bearings therein.

The supporting plate 26 is suspended from the bracket for transverse swinging movement by means of a pivot rod 29 which extends through the bearings in the lugs 27, 28, the upper arm 23 and into screw-threaded engagement with the lower arm 24. For purposes of adjustment, as will be presently described, a suitable hand wheel 33 or the like is mounted upon the upper end of the rod and a lock nut 34 may be screwed into locking abutment with the arm 24.

Preferably the distance between the lugs 27, 28 is somewhat less than the distance between the arms 23, 24 so that when the upper lug 27 rests upon the arm 23, the lower lug 28 is positioned intermediate the arms 23, 24 and is upwardly spaced a short distance from the arm 24. This space is sufficient to permit a suitable thrust bearing 30, upon which the lower lug 28 rests, and a collar 31, positioned between the bearing and the arm 24, to be mounted on the rod 29. The collar 31 is rigidly secured to the rod, as by means of the pin 32 extending therethrough. In consequence of this arrangement it may be seen that, as the hand wheel 33 is rotated in one direction or the other, the pivot rod 29, through its screw-threaded engagement with the arm 24, will be raised or lowered and will carry with it the supporting plate 26 and the motor 25. As may be seen in Fig. 4, the collar assembly is so positioned that a small clearance, to eliminate friction, is provided between the upper arm 23 and the lug 27.

The driving element in the present construction is directly connected to the motor and comprises a flat disk 35 replaceably mounted upon the motor shaft between the motor and the overarm. Preferably the disk is of a fibrous material, such as leather, and is backed or reinforced by rigid disks 36, of less diameter, mounted one on either side of the driving disk. The driving disk is arranged to extend laterally through a suitable aperture provided in the rear side of the spindle housing 15 into peripheral engagement with one of a series or plurality of pulleys or sheaves of varying diameters, which are rigidly mounted upon the spindle 16. Two of such sheaves, designated as 37, 38 are illustrated in this instance.

Thus, by merely swinging the motor to move the driving disk out of engagement with one of the sheaves and then raising or lowering the motor assembly by means of the hand wheel 33, the driving connection between the motor and the spindle may be changed to vary the driven speed of the spindle.

Referring now to the diagrammatic scheme of Fig. 5, the preferred arrangement of the spindle, motor shaft and motor assembly pivot is illustrated, by which arrangement a positive and highly efficient high speed driving connection between the driving disk and the spindle is attained. It will be seen from this view that the vertical axis of the spindle, the motor shaft and the pivot, indicated at 39, 40 and 41 respectively, designate the apices of a triangle. This triangular relationship is effected and maintained by positioning the pivot axis 41 sufficiently close to the spindle axis 39 to prevent the motor axis from swinging into alinement with the spindle and pivot axis.

Since, in this relationship of axes, the spindle axis and the pivot axis are stationary, the motor in moving to effect the driving engagement travels toward the imaginary line drawn between the spindle and pivot axes (as shown by the arrow A) and also decreases the distance between the spindle and motor axes. Consequently, if the motor is driven so that the driving disk, at the point of its contact with the spindle sheave, is moving in the opposite direction (as indicated by the arrow B) a force is set up which tends to move the motor axis toward the aforesaid imaginary line between the spindle and pivot axes.

This force is present at the normal running speed of the machine and maintains the driving and driven elements in close, efficiently operating, frictional engagement. If, however, the speed of the spindle relative to the driving disk is suddenly decreased by the application of a load to the spindle or perhaps by a speeding up of the motor, the force is proportionately increased in strength due to the dragging action of the spindle sheave on the driving disk.

This construction and arrangement of the elements, it will be seen, provides a drive for the spindle which is even, quiet, and positively prevents slipping, vibration or chattering of the driving disk and in consequence is highly efficient.

While not essential, it has been found desirable, in order to maintain the driving elements in contact during the initial or starting movements thereof, to provide a resilient means which normally urges the motor assembly toward the spindle. To this end a helically coiled spring 42 (Fig. 4) is mounted about the pivot rod 29 and is secured at one end to the bracket arm 23 or other suitable stationary part of the machine, with the other end bearing against the rear side of the motor supporting plate.

The driving disk 35, as has been previously mentioned, is preferably of leather or a similar material and the peripheral edge is substantially in the form of a truncated cone in cross section to fit the spindle sheaves 37, 38. It is contemplated that, after a period of operation, this edge will become worn, uneven and mis-shaped. A dressing device, therefore, has been provided which is permanently carried by the motor assembly in proper alinement with the driving disk and is capable of being easily and quickly moved into and out of position to dress the driving disk.

Referring to Figs. 3, 6 and 7, an L-shaped bracket is arranged to be secured by one leg 43 to the supporting plate 26 by bolts 44 in such position that the other leg 45 extends outwardly from and substantially in the plane of the driving disk. The legs of the bracket are preferably formed at such an angle to each other that the horizontal leg 45 extends radially of the driving disk. Suitable longitudinally extending ways 46 formed on the lower face of the leg 45 support a tool slide 47 for movement toward and from the driving disk. The tool slide is grooved at one position to receive a pair of tools 48 for dressing the beveled edges of the disk and at another position to receive an edge dressing tool 49, all of the tools being replaceably held in position by such means as a plate 50 secured to the slide by bolts 51.

A generally well known type of manually operable screw connection 52 between the bracket and the tool slide permits an operator to move the tools into dressing engagement with the disk and to retract the slide after the disk is dressed. If desired, a key 53 may be provided between the bracket leg 43 and the plate 26 to definitely locate and maintain the dressing device in proper operative relation in the assembly. Thus, the driving edge of the disk may be maintained in substantially perfect driving condition at all times by a simple and conveniently mounted means.

I claim as my invention:

A machine of character described comprising, in combination, a stationary support, a spindle carried thereby for rotation on a vertical axis, a plurality of sheaves of different diameters on said spindle, a driving element capable of engaging any of said sheaves, and means for adjustably supporting said element in position comprising a bracket on said support having spaced vertically alined stationary bearings thereon, a member to which said element is rigidly secured having a pair of vertically spaced bearings thereon, a pivot extending through all of said bearings and having a screw-threaded engagement with one of said stationary bearings, and means connecting said driving-element-supporting member to said pivot for vertical movement therewith.

In testimony whereof, I have hereunto affixed my signature.

GEORGE H. CARLSON.